United States Patent Office 3,513,253
Patented May 19, 1970

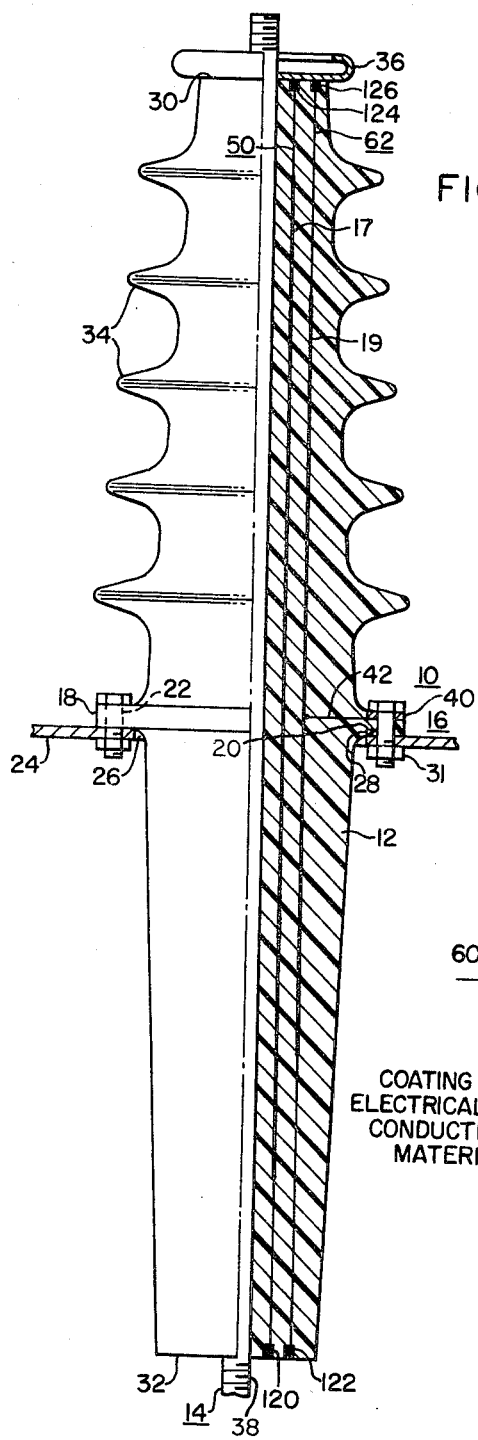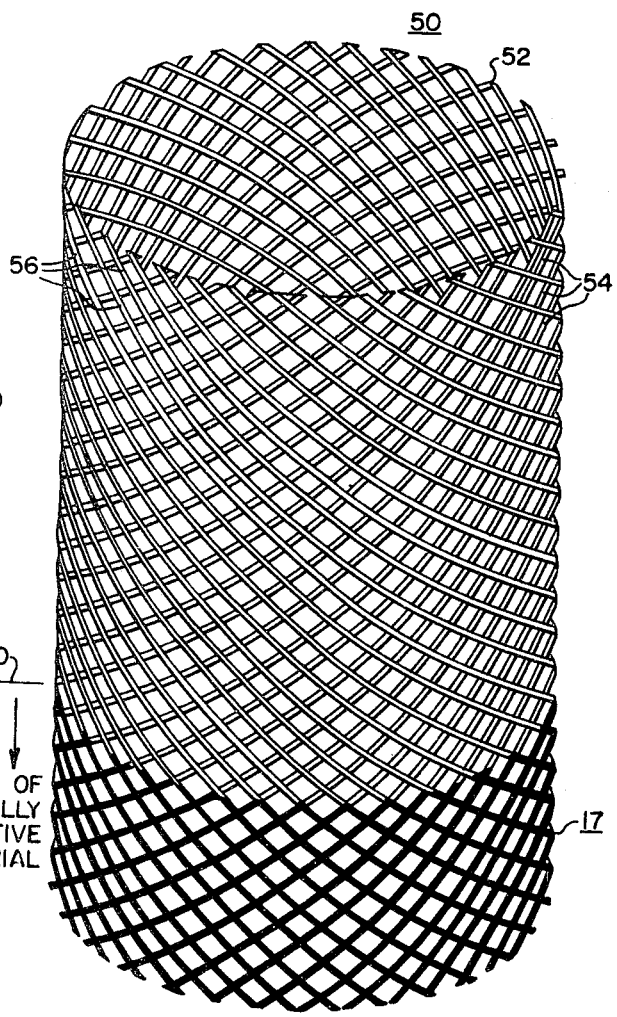

3,513,253
CAST CONDENSER BUSHING HAVING TUBULAR METAL COATED MESH PLATES
Edmund E. Woods, Sharon, Pa., assignor to Westinghouse Electric Corporation, Pittsburgh, Pa., a corporation of Pennsylvania
Filed July 24, 1968, Ser. No. 747,307
Int. Cl. H01b 17/28; B32b 31/06, 31/12
U.S. Cl. 174—143                    7 Claims

ABSTRACT OF THE DISCLOSURE

A condenser type bushing assembly, and methods of manufacturing same, having a generally cylindrical body portion formed of a cast solid insulation system, a conductor stud, and one or more capacitor plates. The capacitor plates are formed of tubular members having different inside diameters, which are embedded in the cast body portion, in spaced, concentric relation about the conductor stud. The tubular members each have a wall formed of electrical insulating strands of filaments, which are bonded together to form an open mesh. The required capacitive relationships are provided by metallic coatings disposed on predetermined portions of the tubular members, while maintaining the open mesh characteristic of the wall.

BACKGROUND OF THE INVENTION

Field of the invention

The invention relates in general to bushing assemblies for electrical apparatus, and more particularly to electrical bushing assemblies of the condenser type, having a body portion formed of a cast solid resinous insualtion system.

Description of the prior art

Condenser type bushings for electrical power apparatus, such as transformers and circuit breakers, commonly employ a built-up capacitor section, which includes layers of paper with metallic foil interspersed between predetermined layers thereof. The paper may be resin impregnated, which bonds the laminated section into a solid, or the paper may be oil impregnated. The capacitor section is then assembled within a metallic mounting flange and upper and lower porcelain type housings, with the space between the capacitor portion and the porcelain housing usually being filled with oil, or other suitable insulating material.

While bushings properly manufactured and assembled according to these prior art teachings are electrically suitable, they are relatively costly to manufacture. Further, proper electrical performance demands that the utmost care be taken in selecting the size of the foil and its placement, as the winding of the built-up paper section progresses. Errors by operating personnel in the selection of the size and/or in the placement of the foils will change the electrical stress distribution across the bushing, resulting in a bushing structure which is less than optimum.

The development of non-tracking, weather-resistant, high strength resinous casting systems has enabled condenser type bushings to be cast, with the metallic foils being embedded in the cast solid insulation. Cast bushings eliminate the time consuming winding of the paper, and critical placement of the capacitor foils, as the capacitor plates and conductor studs may be placed in a mold and the mold filled with the desired liquid resin system, which is subsequently cured to a solid. The cast electrical bushing is excellent mechanically, as it is not susceptible to breakage due to shock, and it is also excellent electrically if there are no cracks, voids or air inclusions in the cast body portion, and if the capacitor plates maintain their original position during the introduction of the liquid resin system, and subsequent curing of the resin system to a solid. This latter requirement, however, has proven to be troublesome, as the capacitor plates are relatively thin and difficult to anchor in the proper position within the mold. Their positions are often altered during the introduction of the resin system into the mold, and during the subsequent curing of the resin system. Further, incomplete bonding between the capacitor plates and the resin system sometimes occurs, which mechanically weakens the assembly and causes voids which impair the bushing electrically. The voids may contain air which will ionize when the bushing is placed in service, causing radio interference, as well as a degradation of the surrounding solid insulation, which may eventually lead to failure of the bushings.

Thus, it would be desirable to eliminate the costly winding the the capacitor section of capacitor type bushings, by casting the capacitor plates within a resinous insulation system which is free from cellulosic materials. Further, it would be desirable to provide a bushing assembly, and a method of manufacturing the same, which insures that the capacitor plates will maintain their preplaced positions, and that the resin system will bond to the capacitor plates without trapping air and without producing voids between the cured resin system and the capacitor plates.

SUMMARY OF THE INVENTION

Briefly, the present invention is a new and improved electrical bushing of the condenser type, and methods of manufacturing the same, wherein the body portion of the bushing is formed from a castable resin system. The capacitor plates are provided by tubular members having predetermined inside diameters, with the tubular members having a wall formed of electrical insulating filaments or strands which are bonded together to form an open mesh. Each tubular member has a conductive metallic coating applied to predetermined areas thereof, such as by spraying the tubes with molten, atomized aluminum, while the tube is suitably masked, with the application of the conductive coating being such that the mesh characteristic of the tube wall is maintatined. The tubular members have a length sufficient to cooperate with holding and locating projections within the casting mold. The conductor stud and tubular members are disposed within the mold, in concentric spaced relation, with the tubular members being held by the special projections. The mold is then filled with a suitable liquid resinous insulation system, under vacuum, with the resin system being introduced into the mold from the bottom thereof. This procedure forces any air still within the mold upwardly, and out of the mold, insuring that there will be no air trapped therein. The liquid resinous insulation system flows through the openings in the mesh sidewalls of the tubular members, assuring complete void free bonding of the resin system to the tubular members, and this construction reinforces and mechanically strengthens the bushing. Since the ends of the tubular members are firmly held by the projections in the mold, they will maintain their preplaced positions as the resin system is introduced into the mold, and during the subsequent curing of the cast resinous insulation system. When the solidified bushing is removed from the mold, the grooves therein caused by the projections in the mold which held the tubular members, are filled with a solid resinous insulation system, to prevent the tubular members from being in contact with air.

BRIEF DESCRIPTION OF THE DRAWING

Further advantages and uses of the invention will become more apparent when considered in view of the following detailed description and drawings, in which:

FIG. 1 is an elevational view, partially in section, of an electrical bushing of the condenser type, constructed according to the teachings of the invention;

FIG. 2 is a perspective view of a capacitor plate for the bushing shown in FIG. 1, which is constructed according to the teachings of the invention.

DESCRIPTION OF THE PREFERRED EMBODIMENTS

Figure 3:
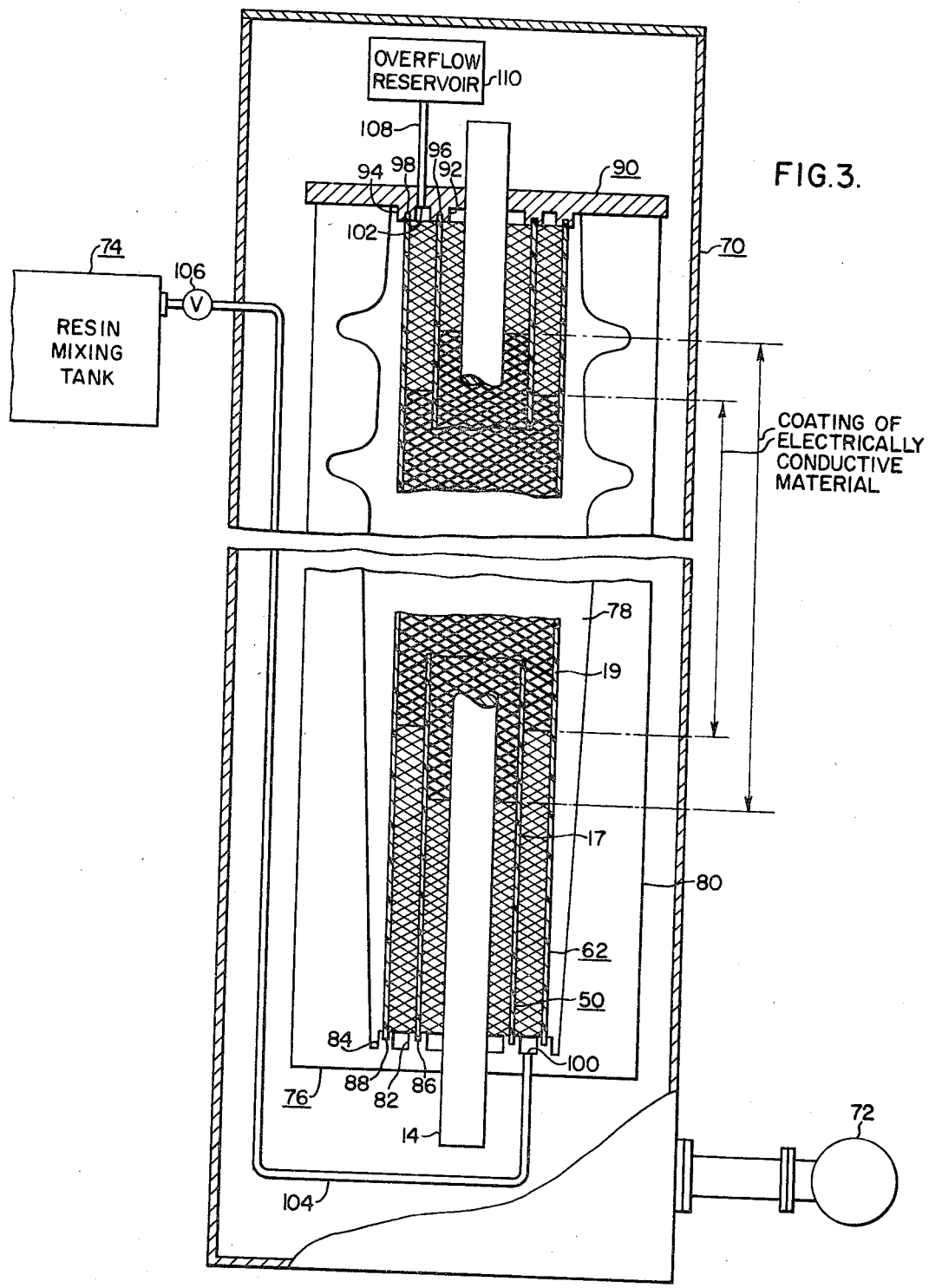
FIG. 3 is an elevational view, partially in section, of apparatus for casting electrical bushings according to the teachings of the invention.

Referring now to the drawings, and FIG. 1 in particular, there is shown an elevational view, partially in section, of an electrical bushing assembly 10 constructed according to the teachings of the invention. In general, bushing assembly 10 includes a substantially cylindrical, elongated body member or portion 12, formed of a castable electrical insulating material, an axially disposed electrical conductor or stud 14, mounting means 16, and tubular capacitor plates 17 and 19 which are concentrically disposed about conductor stud 14. As illustrated in FIG. 1, mounting means 16 may include a flange 18 which is an integral portion of the cast body member 12, having an annular undercut or groove 20 disposed therein, and a plurality of openings 22. The flange 18, the groove 20, and the openings 22 allow bushing assembly 10 to be disposed in sealed engagement with a casing 24 of the electrical apparatus it is to be associated with, such as a transformer or a circuit breaker. For example, as shown in FIG. 1, bushing assembly 10 may be disposed perpendicularly through an opening 26 in the casing 24. A suitable gasket member 28 is disposed in the annular groove 20, and the bushing assembly 10 is fixed relative to the casing 24 by suitable fastening means, such as nut and bolt assemblies 31 which are disposed through the openings 22 in the shoulder or flange 18, and through corresponding openings disposed about the opening 26 in the casing 24. Or, bolts may be welded to the casing 24 which will extend upwardly through the openings 22 in the flange 18.

The electrical conductor 14, which may be copper or aluminum, forms the axial conductor for the bushing assembly 10, and also the terminal stud, having suitable means at each end thereof, such as threads 38, for electrically connecting the bushing assembly to the encased electrical apparatus, and also externally to the associated electrical system.

Body member 12 includes first and second ends 30 and 32, respectively, and, as illustrated in FIG. 1, it may have a plurality of weather sheds 34 cast integrally therewith on the weather end of the bushing. A metallic corona shield 36 may be disposed at the first end 30 of body portion 12, which surrounds conductor 14 with a smooth rounded surface, to reduce the potential gradient at the point where the conductor stud enters body portion 12.

The resinous insulating material of which the body member 12 of bushing assembly 10 is formed may be any suitable thermosetting resin. Or, if the softening temperature is high enough, a thermoplastic resin system may even be used. The resinous polymeric epoxides have been found to be excellent in forming bushings of this type, possessing good physical strength, good weather resistant characteristics, relatively low shrinkage upon curing, good adherence to metallic inserts, and excellent resistance to cracking upon thermal cycling. Alumina trihydrate may be utilized as a filler, to obtain the necessary non-tracking characteristics.

A specific example of a resinous casting system which is suitable is as follows:

| Material: | Parts by weight |
|---|---|
| Epoxy resin (190–195 epoxide equivalent) | 100 |
| Hexahydrophthalic anhydride | 80 |
| A product of equimoler mixture of triethylanolamine titanate and trihexylene glycol biborate (see U.S. Pat. 2,941,981) | .5 |
| Particulated alumina trihydrate (particle size 10 microns or less) | 270 |
| Particulated quartz (80–400 mesh) | 150 |

The quartz filler in the above example increases the strength of the casting. It will be understood that the above tabulation is merely an example of a suitable resin system which may be used, with the parts by weight being variable over predetermined ranges, and also other resins, curing agents, accelerators, and fillers which will provide the desired results, may be utilized.

The bushing assembly 10 shown in FIG. 1 is illustrated with the shoulder or flange 18 being an integral part of the cast body portion 12. However, the same basic structure shown in FIG. 1, except with the flange 18 being formed of a metallic insert embedded in the body member 12 at the time of casting, would be equally suitable. Or, a metallic flange may be telescoped over body portion 12 of the bushing assembly 10 after it is cast, and secured thereto by a suitable adhesive, such as an epoxy. Also, instead of casting the weather sheds 34 integrally with the body member 12, it would be suitable to form the body portion 12 without weather sheds, and then enclose the weather end of the bushing within a suitable porcelain housing which includes weather sheds. If a porcelain weather housing is used, the space between the body portion and the porcelain housing may be filled with oil, a resilient sleeve, or any other suitable insulating means.

In order to more uniformly stress the insulation of body member 12, tubular metallic capacitor plates 17 and 19 are embedded within body member 12, concentrically about conductor 14. Two capacitor plates are shown in FIG. 1 for purposes of example, but it is to be understood that any desired number may be used, with the number depending upon the voltage which will be applied to the conductor stud 14. Equal capacitance between the capacitor plates will distribute the electrical stress substantially equally between them, which takes maximum advantage of the insulation and prevents stress concentrations which may cause a breakdown or failure of the solid insulation. Thus, the diameters of the tubular capacitor plates, and their axial lengths are calculated to provide the particular capacitive relationships desired. Since the surface area of the tubular plates increases as their diameters increase, their axial length will decrease, if substantially equal capacitance is desired between adjacent plates. Thus, tubular capacitor plate 17, which has a smaller diameter than tubular capacitor plate 19, has a longer axial dimension than capacitor plate 19, in order to provide substantially the same surface area. The outermost capacitor plate, which in this instance is capacitor plate 19, is electrically connected to the casing 24. When the mounting flange is formed integrally with the cast body member 12, from the resinous insulation system, this grounding connection may be provided by connecting capacitor plate 19 to a metallic washer-like member 40 via a conductor 42, with the metallic washer member 40 being embedded in the flange about one of the openings 22. Thus, when a bolt is disposed through the opening, it will contact the washer member 40, and when it is secured to the casing via its associated nut, the grounding to the casing will be completed. This arrangement provides a convenient test point for checking the power factor, and thus the electrical condition of the bushing, by merely removing the bolt disposed through the opening which is associated with washer member 40. If a metallic flange is used, the outermost capacitor plate is connected directly to the metallic flange, which will ground the capacitor plate when the metallic flange is mounted on the casing 24.

While the metallic capacitor plates 17 and 19 are illustrated in FIG. 1 as being axially continuous, it would be equally suitable to utilize split or divided capacitor plate structures, wherein the capacitor plates are axially spaced, as well as being radially spaced, with the axial spacing becoming progressively less as the diameters of the capacitor plates are increased, until reaching the outside plate, which may be continuous. This type of capacitive structure is shown in co-pending application Ser. No. 623,854, filed Mar. 17, 1967, now U.S. Pat. No. 3,394,455, which application is assigned to the same assignee as the present application.

It will be noted that the metallic capacitor plates 17 and 19 do not extend to the ends 30 and 32 of body member 12, with the axial dimension of the plates decreasing as the radial location steps progressively outward. Since the stress distribution depends upon the positions of the capacitor plates, their location within the body member 12 is critical. Thus, when the conductor stud 14 and capacitor plates 17 and 19 are placed within a bushing mold, prior to the introduction of the casting resin system, it is of the utmost importance that the capacitor plates maintain their pre-placed positions. Further, the capacitor plates should not be deformed and moved during the shrinkage of the casting resin, which occurs when the resin is cured to a solid.

Since the casting resin system necessarily must have a high percentage of filler, such as particulated alumina trihydrate, for obtaining the necessary tracking resistance, and particulated quartz for reducing shrinkage and for obtaining a cast structure which has a coefficient of thermal expansion which more closely matches that of the conductor stud 14, the resin system will exert a force against the capacitor plates as it is introduced into the mold. Thus, the capacitor plates must be firmly secured in their desired positions. In addition to being firmly secured within the casting mold, the capacitor plates must be constructed such that the resin system will tenaciously adhere thereto without any voids, and with a bond which will not develop circumferential cracks or voids between the capacitor plates and the resin system upon thermal cycling of the bushing assembly 10.

The construction of the capacitor plates 17 and 19 shown in FIG. 1 will now be described. Since capacitor plates 17 and 19 may be of similar construction, differing only in their dimensions, only the construction of capacitor plate 17 will be described in detail.

Specifically, FIG. 2 is a perspective view of capacitor plate 17, which is constructed according to the teachings of the invention. Capacitor plate 17 includes a tubular member 50 having an overall axial length which is just slightly less than the axial dimension of the body member 12 shown in FIG. 1. Tubular member 50 has a wall portion 52 formed of a plurality of strands, filaments or fibers 54, which are disposed in spaced relation with one another, and which are bonded to a plurality of like fibers 56, which are also in spaced relation with one another, but which are directed in a direction which causes them to contact fibers 56. Fizers 54 and 56 may be interleaved or woven together, or they may simply contact one another without any interleaving. The wall portion may have more than one layer of fibers 54 and 56, as necessary to obtain the required mechanical strength. The filaments or fibers 54 and 56 are constructed of an electrical insulating material, with fiber glass or glass fibers being excellent, as they will retain their strength at the elevated temperatures involved in casting the resin system within the mold. Glass fibers also possess electrical characteristics which will not detract from the electrical characteristics of the bushing.

The tubular member 50 may be formed by winding glass fibers on a suitable form or mandrel, with the glass fibers being impregnated with a suitable adhesive, such as an epoxy resin system, and wound wet. The resin impregnated fibers may then be cured, to provide a tubular structure having a rigid high strength wall, which will retain its strength at the elevated temperatures at which the resin system forming the body member 12 of the bushing assembly 10 is poured, gelled, and cured. The filaments or fibers may also be dry wound on a suitable mandrel, and subsequently impregnated with a suitable adhesive or resinous insulation system, which is cured to solidify and form a tubular member having a high strength wall portion.

The strands or fibers of which the tubular members are formed may have a symmetrical cross section, or they may have a substantially rectangular cross section, with the larger of the two dimensions of the rectangular cross section being wound flat against the winding form or mandrel to provide more surface area. A typical filament wound open mesh tube may utilize fibers which are $\frac{1}{8}$ inch wide and $\frac{1}{16}$ inch thick, which are wound to provide a tube having openings in the wall portion thereof which have a dimension of $\frac{1}{8}$ inch on a side, and a wall thickness of approximately $\frac{1}{16}$ of an inch. Typical electrical characteristics of epoxy filament wound glass fiber tubes are an electrical strength of 400 volts per mil and a power factor of 1% at 23° C. While the tubular member 50 has been described as being formed of epoxy impregnated glass fiber strands, it is to be understood that other insulating fibers and adhesives may be used to provide the necessary high strength tubular structure with a mesh wall, which will possess the necessary electrical characteristics and strength at elevated temperatures.

The next step in providing tubular capacitor plate member 17 is to uniformly coat a predetermined portion of the tube with a suitable electrically conductive material, in order to form the capacitor plate 17. As shown in FIG. 2, the portion of the tubular member 50 starting at point 60 is coated with electrically conductive material. This coating will then extend to within a predetermined dimension of the other end of the tubular member. The coating of electrically conductive material may be in the form of a metal, such as copper or aluminum, or it may be a material having a higher resistivity, depending upon the characteristics desired. For example, the coating may be semiconductor, having a voltage dependent resistivity, such as a coating of silicon carbide. For most applications, aluminum has been found to be excellent, with the coating being applied by melting, atomizing and spraying the aluminum. Areas of the tubular member 50 which are not to be metallized may be easily masked. Capacitor plate 17 may have a continuous wall portion along its axial dimension, as shown in FIG. 1, or it may be split into two axial sections, such as shown in the hereinbefore mentioned U.S. Pat. No. 3,394,455. Regardless of the type of conductive material used, and regardless of the method of applying the coating, the electrically conductive material should coat the strands in the selected area, or areas, while maintaining the open mesh characteristic of the wall section. In other words, it is important that the coating should not be thick enough to close the openings between the bonded strands.

As hereinbefore stated, the axial length of the tubular member 50 should be such that it extends substantially the complete length of the body member 12. This is also a requirement for any additional capacitor plates utilized, such as for capacitor plate 19 shown in FIG. 1. Thus, capacitor plate 19 is formed on a tubular member 62, which is the same length as tubular member 50, both having first and second ends which extend substantially to the first and second ends 30 and 32 of the body member 12. The actual longitudinal dimensions of the tubular members 50 and 62, however, should be slightly less than the length of body member 12. The tubular members 50 and 62 may thus be embedded in body portion 12 without extending to the outer surface thereof. It is important that the tubular members be completely sealed within body member 12, in order to prevent the fibers of the tube from absorbing moisture, which would degrade the electrical strength of the bushing.

FIG. 3 illustrates apparatus for casting electrical bushing assembly 10 according to a method of the invention. In general, the apparatus shown in FIG. 3 includes a vacuum chamber 70, a vacuum pump 72, a resin mixing tank 74, and a bushing mold 76, which is disposed within the vacuum chamber 70. The bushing mold 76 includes a mold cavity 78 formed by two matching sections or portions of the mold, which sections are held together by bolts or other suitable fastening means. Mold 76, in FIG. 3 is sectioned along the parting line of the two matching sections, thus FIG. 3 illustrates only one of the two sections, which is given the reference numeral 80. The bottom portions of the two sections, such as section 80, has circumferentially raised portions or projections 82 and 84 which have circumferential grooves 86 and 88, respectively, disposed therein, for receiving the ends of the tubular members 50 and 62, respectively. Mold 76 also has a cover portion 90 which has similar projections having grooves therein, such as projections 92 and 94 which have grooves 96 and 98, respectively, disposed therein for receiving the remaining ends of tubular members 50 and 62, respectively.

Mold 76 has openings 100 and 102 disposed through its bottom portion and through its cover 90, respectively, in addition to axially disposed openings for receiving the conductor stud 14. Opening 100 is connected through piping means 104 to the resin mixing tank 74. The resin mixing tank 74 is disposed outside the vacuum chamber 70, and is open to the atmosphere, at least while the resin system is being introduced into the mold. A valve 106 may be located in piping means 104 to control the flow of the resin system into the mold 76. Opening 102 is connected via piping means 108 to a suitable overflow chamber 110, which is disposed within the vacuum chamber.

Thus, in casting the bushing assembly 10 according to the teachings of the invention, the necessary number of filament wound tubular members should be provided, in this instance two members 50 and 62, and they would each have the same axial dimension, and different inside diameters, as required by the specific application. Each of the tubular members 50 and 62 would be coated with an electrically conductive material, such as aluminum, to provide capacitor plates 17 and 19, respectively.

The outer tubular member 62 may then have electrical conductor 42 connected to its capacitor plate 19. Insert 40, which surrounds one of the openings 22 in the flange 18, is connected to the other end of electrical conductor 42, and the insert 40 and tubular member 62 may be disposed in the proper position within mold section 80. The other mold section may then be assembled with mold section 80, to form mold cavity 78, with the lower end of tubular member 62 being firmly seated in the groove 88 in the projection 84 which is upstanding from the bottom of the mold cavity. The conductor stud 14 may then be disposed within the mold cavity, with its lower end extending through a suitable tight fitting opening disposed coaxially through the bottom portion of the mold 76. The remaining tubular member 50 may then be telescoped over conductor stud 14, with its lower end being inserted firmly into groove 86 disposed in the upstanding end of projection 82. The cover 90 may then be disposed on the two mold sections, with conductor stud 14 extending through a tight fitting opening in the cover, and with the upper ends of tubular members 50 and 62 entering the grooves 96 and 98, respectively, disposed in the circumferential projections 92 and 94, respectively, which project downwardly into the mold cavity. Thus, the tubular members 50 and 62 are firmly held between the two ends of the mold 76, which positively locates the capacitor plate portions 17 and 19 of the tubular members in the desired spaced relation about the conductor stud 14.

The mold 76 with its assembled inserts may then be placed within the vacuum chamber 70, which is sealed and evacuated to a predetermined low pressure, such as 1 to 5 millimeters of mercury. The vacuum chamber is heated to approximately the pouring temperature of the resin system, which is usually in the range of 80 to 110° C., such as 105° C. ±5° for the specific resin formulation hereinbefore disclosed. The mold 76 and its inserts are held at this elevated temperature in the vacuum for a predetermined period of time which is sufficient to insure that moisture and air have been removed from the mold and the tubular members 50 and 62.

The resin system is mixed in the mixing tank 74, at an elevated temperature, which is dependent upon the resin system used, such as 105° C. ±5°. At this temperature the resin mixture is fluid, and will readily flow through piping means 104. The resin system may be mixed under a vacuum, if desired, but after mixing the vacuum should be removed, as atmospheric pressure will force the resin system into the evacuated mold 76 when the valve 106 is opened. The resin system enters the mold 76 from the bottom thereof, pushing any air still not removed from the mold upwardly, instead of trapping it in the mold, which could occur if the resin system were to be introduced into the top portion of the mold. The fluid resin system flows about the conductor stud and tubular members 50 and 62, and through the openings in the walls of the tubular members, and it is allowed to rise until it completely fills the mold cavity and flows through piping means 108 into the overflow reservoir 110. Once the resin system enters the overflow chamber, which may be observed through a suitable sight port in the vacuum chamber, the valve 106 is closed to stop the flow of the resin system.

The vacuum chamber 70 may then be brought back to atmospheric pressure, and the mold 76 removed and placed in a suitable oven to gel the poured resin system. A typical gel cycle for epoxy resin systems is about two hours at a temperature of 100–120° C. After the resin system has gelled, the cast bushing may be removed from the mold, by removing the cover 90 and separating the two like mold sections. The cast bushing is then placed in an oven for a post-cure cycle, with a typical cycle being six hours at 150° C. After the mold 76 has been removed from the vacuum chamber, the mixing chamber 74 and piping means may be cleaned, with a suitable solvent, such as trichloroethylene, in order to prepare it for the next batch of resin.

When the resin system gels and is cured, it will completely surround the tubular members 50 and 62, and extend through the plurality of openings in the mesh walls thereof. Thus, the resin system will tenaciously adhere to the tubular members, with no chance of pulling away from the tubular members during thermal cycling, which could occur if the tubular members had a smooth continuous wall portion. The contact between the tubular members and the resin system is not a smooth continuous curved plane, but has a large plurality of solid continuous "fingers" of resin which project through the tube wall, and which are integral with solid resin disposed on each side of the wall portions.

After the bushing assembly has been removed from the mold, the grooves left in the ends of the bushing assembly 10 by the projections in the mold which fixed the positions of the tubular members 50 and 62, are filled with a suitable resin system, which may be the same resin system used to cast the body member 12. This is illustrated in FIG. 1, with the lower ends of tubular members 50 and 62 being sealed as shown at 120 and 122, respectively, and with their upper ends being sealed at 124 and 126, respectively.

In summary, there has been disclosed a new and improved cast electrical bushing assembly of the condenser type, and methods of manufacturing same, which overcome the disadvantages of prior art condenser bushings constructed of laminated paper, and of prior art cast solid condenser bushings. The condenser plates are firmly fixed in position by insulating tubular members which extend to positions in the mold where they may be located and firmly held by projections in the mold. The capacitor plates are integral portions of the insulating tubular members, as the tubular members have a mesh wall with the capacitor plates being in the form of a coating applied to the fibers of predetermined sections of the wall of the tube. The mesh construction of the tubular members, instead of being a potential weak point in the bushing, which may institute a crack or void in the bushing, actually strengthens the body member 12 and prevents cracking thereof. In other words, the mesh construction of the tubular members reinforces the cast portion of the bushing assembly, and makes it mechanically stronger than a bushing of similar size and construction which does not have capacitor plates.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. An electrical insulating bushing assembly, comprising:
    a substantially cylindrical body member having first and second ends,
    said body member being formed of a cast electrical insulating material,
    an axially extending electrical conductor disposed in said body member,
    a plurality of tubular members each having first and second ends and a rigid wall formed of electrical insulating filaments bonded together to form an open mesh,
    said plurality of tubular members having like longitudinal dimensions and different inside diameters,
    said plurality of tubular members each having a coating of electrically conductive material disposed over a predetermined portion thereof, spaced from its ends, which coats the filaments of said predetermined portion while maintaining the open mesh characteristic of the wall,
    said plurality of tubular members being embedded in said body member, in spaced concentric relation about said electrical conductor, with their first and second ends extending substantially to the first and second ends, respectively of said body member.

2. The electrical insulating bushing assembly of claim 1 wherein the electrical insulating filaments of said at least one tubular member are glass fibers.

3. The electrical insulating bushing assembly of claim 1 wherein the electrically conductive coating on the filaments of said at least one tubular member is aluminum.

4. The electrical insulating bushing assembly of claim 1 wherein the electrically conductive coating is axially continuous.

5. The electrical insulating bushing assembly of claim 1 wherein the electrically conductive coating includes two axially spaced sections.

6. The electrical bushing assembly of claim 1 including a mounting flange disposed intermediate the ends of said body member, the conductive coating on the outermost tubular member being electrically connected to a portion of said flange which is adapted to connect said electrically conductive coating to the casing of the apparatus the electrical bushing is to be associated with.

7. The electrical bushing assembly of claim 6 wherein the mounting flange is an integral part of the body member, and the portion of the mounting flange to which the conductive coating on the outermost tubular member is connected includes a metallic washer member disposed to be electrically connected to the casing of its associated electrical apparatus when the mounting flange is bolted to the casing.

References Cited

UNITED STATES PATENTS

| 3,001,005 | 9/1961 | Sonnenberg | 174—142 |
| 3,394,455 | 7/1968 | Grimmer | 174—143 X |

FOREIGN PATENTS

| 751,292 | 1/1967 | Canada. |
| 1,495,367 | 8/1967 | France. |
| 772,054 | 4/1957 | Great Britain. |
| 810,814 | 3/1959 | Great Britain. |

LARAMIE E. ASKIN, Primary Examiner

U.S. Cl. X.R.

264—262